(12) United States Patent  
Usami et al.

(10) Patent No.: US 9,802,729 B2  
(45) Date of Patent: Oct. 31, 2017

(54) BLOW MOLDING METHOD, BLOW MOLD, AND BLOW-MOLDED CONTAINER

(71) Applicant: NISSEI ASB MACHINE CO., LTD., Nagano (JP)

(72) Inventors: Masayuki Usami, Komoro (JP); Hiroyuki Tsukamoto, Komoro (JP); Kazuyuki Yokobayashi, Komoro (JP); Yoichi Tsuchiya, Komoro (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 275 days.

(21) Appl. No.: 14/380,498

(22) PCT Filed: Feb. 13, 2013

(86) PCT No.: PCT/JP2013/053314  
§ 371 (c)(1),  
(2) Date: Aug. 22, 2014

(87) PCT Pub. No.: WO2013/125401  
PCT Pub. Date: Aug. 29, 2013

(65) Prior Publication Data  
US 2015/0021343 A1    Jan. 22, 2015

(30) Foreign Application Priority Data  
Feb. 23, 2012 (JP) .................... 2012-037316

(51) Int. Cl.  
*B65D 6/00* (2006.01)  
*B65D 1/02* (2006.01)  
(Continued)

(52) U.S. Cl.  
CPC ............ *B65D 1/0246* (2013.01); *B29C 49/18* (2013.01); *B29C 49/185* (2013.01);  
(Continued)

(58) Field of Classification Search  
CPC ... B65D 1/0246; B29C 49/18; B29C 49/6472; B29C 49/6481; B29C 2049/483  
See application file for complete search history.

(56) References Cited

U.S. PATENT DOCUMENTS 4,233,022 A * 11/1980 Brady ................. B29C 49/4823  
                                                                    215/373  
4,385,089 A * 5/1983 Bonnebat ............ B29C 49/6472  
                                                                    215/379

(Continued)

FOREIGN PATENT DOCUMENTS

CN    101808801 A    8/2010  
JP    61-293829    12/1986  
(Continued)

*Primary Examiner* — Jeffrey Allen  
(74) *Attorney, Agent, or Firm* — David L. Hoffman; Hoffman Patent Group

(57) ABSTRACT

A blow molding method includes a primary blow molding step that molds a preform (200) in a primary blow mold (300A) that includes a primary temperature control section (330) to obtain an intermediate molded article (202), a shrinkage step that discharges blow air from the intermediate molded article to shrink the intermediate molded article, and a secondary blow molding step that blow-molds the intermediate molded article (204) that has shrunken in a secondary blow mold that includes a secondary temperature control section (430) to obtain a final molded article. The primary blow molding step cools a first intermediate molding region of the intermediate molded article that follows a neck using a first primary temperature control section, and the shrinkage step shrinks a second intermediate molding region of the intermediate molded article of which the temperature is controlled by a second primary temperature control section.

13 Claims, 11 Drawing Sheets

(51) Int. Cl.
  *B29C 49/18*   (2006.01)
  *B29C 49/64*   (2006.01)
  *B29D 22/00*   (2006.01)
  B29C 47/06    (2006.01)
  B29L 31/00    (2006.01)
  B29C 49/48    (2006.01)
  B29L 22/00    (2006.01)

(52) U.S. Cl.
  CPC .......... *B29C 49/649* (2013.01); *B29D 22/003* (2013.01); *B65D 1/02* (2013.01); *B65D 1/0223* (2013.01); *B29C 47/06* (2013.01); *B29C 2049/4851* (2013.01); *B29C 2049/4892* (2013.01); *B29C 2793/009* (2013.01); *B29C 2793/0027* (2013.01); *B29L 2022/00* (2013.01); *B29L 2031/712* (2013.01); *B29L 2031/716* (2013.01)

(56) References Cited

U.S. PATENT DOCUMENTS

| | | | | |
|---|---|---|---|---|
| 4,618,515 | A * | 10/1986 | Collette | ............ B29C 49/6445 215/379 |
| 6,080,353 | A | 6/2000 | Tsuchiya | |
| 6,228,317 | B1 | 5/2001 | Smith et al. | |
| 7,138,082 | B2 * | 11/2006 | Nahill | .................... B29C 49/42 264/533 |
| 2010/0200531 | A1 | 8/2010 | Komiya et al. | |
| 2012/0187068 | A1 | 7/2012 | Fuse et al. | |

FOREIGN PATENT DOCUMENTS

| | | |
|---|---|---|
| JP | 3-290225 | 12/1991 |
| JP | 10-100238 | 4/1998 |
| JP | 10-286874 | 10/1998 |
| JP | A2003-231170 | 8/2003 |
| JP | A2005-028680 | 2/2005 |
| JP | A2006-264035 | 10/2006 |
| JP | A-2011-051604 | 3/2011 |

* cited by examiner

BLOW MOLDING METHOD, BLOW MOLD, AND BLOW-MOLDED CONTAINER

This application is a U.S. national stage application of International Patent Application No. PCT/JP2013/053314, having an international filing date of Feb. 13, 2014, which designated the United States and which claims priority from Japanese Patent Application No. 2012-037316, filed on Feb. 23, 2012, the entirety of both of which are incorporated herein by reference.

BACKGROUND

Technical Field

The present invention relates to a blow molding method that includes a primary blow molding step and a secondary blow molding step, a blow mold, a blow-molded container, and the like.

Background Art

A blow molding method that includes a primary blow molding step and a secondary blow molding step, a blow mold used for the blow molding method, and a blow-molded container obtained using the blow molding method are disclosed in Patent Documents 1 and 2, for example. The blow molding method blow-molds and expands a preform heated to an optimum stretch temperature in a heated primary blow mold into an intermediate molded article. The intermediate molded article is heated in the primary blow mold, and removed from the primary blow mold. The intermediate molded article that has shrunken and softened is blow-molded and expanded again in a secondary blow mold into a final molded article. A heat-resistant container is thus obtained. The primary blow mold used for the blow molding method is heated, and the secondary blow mold is heated at a low temperature as compared with the primary blow mold, or maintained at room temperature.

Patent Documents 3 to 5 disclose a method that blow-molds a preform in a blow mold so that a thread is formed in an intermediate area of the resulting blow-molded container, and removes the part of the blow-molded container that is situated on the side of the opening with respect to the thread to produce a wide-mouth container.

RELATED-ART DOCUMENT

Patent Document

Patent Document 1: JP-A-2003-231170
Patent Document 2: JP-A-2006-264035
Patent Document 3: JP-A-61-293829
Patent Document 4: U.S. Pat. No. 6,228,317
Patent Document 5: JP-A-2011-51604

SUMMARY OF THE INVENTION

Technical Problem

According to the heat-resistant container molding method disclosed in Patent Documents 1 and 2, the intermediate molded article shrinks in the horizontal axis direction and the vertical axis direction when the intermediate molded article is removed from the primary blow mold. Therefore, when the intermediate molded article is molded by primary blow molding to have a shape in which the diameter of the body differs in the vertical axis direction, the shaped part (having a specific shape) of the intermediate molded article is shifted in position in the vertical axis direction due to shrinkage when the intermediate molded article is removed from the primary blow mold. The shaped part is further blow-molded in the secondary blow mold to obtain the final shape. In this case, it is necessary to accurately transfer the shaped part of the intermediate molded article to a specific cavity surface (provided with the final shape) in the secondary blow mold. Therefore, it is necessary to estimate the amount of shrinkage in advance so that the shaped part of the intermediate molded article formed by the primary blow mold is placed corresponding to the specific cavity surface in the secondary blow mold. However, since it is difficult to estimate the amount of shrinkage in advance, it is necessary to process the primary blow mold by trial and error.

For example, the above problem also occurs when molding the wide-mouth container disclosed in Patent Documents 3 to 5 using the molding method disclosed in Patent Documents 1 and 2. In Patent Documents 3 to 5, the thread is formed by a single blow molding step. When using the molding method disclosed in Patent Documents 1 and 2, the thread may be formed by primary blow molding and secondary blow molding (two-step blow molding), for example. In this case, the part of the molded article that corresponds to the thread formed using the primary blow mold shrinks in the vertical axis direction when removed from the primary blow mold. Therefore, the cavity corresponding to the part that corresponds to the thread and is formed by primary blow molding must be designed (processed) by trial and error.

An object of several aspects of the invention is to provide a blow molding method, a blow mold, and a blow-molded container that can expand the application range of the two-step blow molding method by making it possible to accurately transfer a specific part of an intermediate molded article obtained by primary blow molding to a specific cavity position in a secondary blow mold without requiring complex design.

Solution to Problem (1) According to one aspect of the invention, there is provided a blow molding method comprising:

a primary blow molding step that blow-molds a preform into an intermediate molded article in a primary blow mold, the primary blow mold including a primary temperature control section;

a shrinkage step that discharges blow air from the intermediate molded article to shrink the intermediate molded article; and a secondary blow molding step that blow-molds the intermediate molded article into a final molded article in a secondary blow mold, the secondary blow mold including a secondary temperature control section, wherein the primary blow mold includes a first primary temperature control section and a second primary temperature control section that are defined by dividing the primary temperature control section in a vertical stretch direction, wherein the primary blow molding step cools a first intermediate molding region of the intermediate molded article that follows a neck using the first primary temperature control section, and wherein the shrinkage step shrinks a second intermediate molding region of the intermediate molded article, the temperature of the second intermediate molding region having been controlled by the second primary temperature control section.

According to one aspect of the invention, the primary blow molding step cools the first intermediate molding region of the intermediate molded article that follows the neck using the first primary temperature control section.

Therefore, the first intermediate molding region that has been cooled by the first primary temperature control section shrinks to only a small extent even when the intermediate molded article is removed from the primary blow mold. Since the temperature of the neck of the intermediate molded article is not controlled, the neck does not shrink. Specifically, the neck and the first intermediate molding region that follows the neck rarely show a change in dimension even when the blow air is discharged from the intermediate molded article, and the intermediate molded article is removed from the primary blow mold. When the intermediate molded article is transferred to the secondary blow mold in a state in which the neck of the intermediate molded article is held by a transfer member, the intermediate molded article is placed at a specific position in the secondary blow mold since the first intermediate molding region that follows the neck substantially has not changed in dimension. Therefore, part of the second intermediate molding region that is situated close to the first intermediate molding region is also placed at a specific position in the secondary blow mold. Accordingly, even when the first intermediate molding region or part of the second intermediate molding region that is situated close to the first intermediate molding region is shaped by the primary blow molding step so that the diameter of the body differs depending on the position along the vertical axis, for example, the shaped part can be positioned with respect to a specific cavity surface of the secondary blow mold.

The primary blow mold may include a primary insulating layer that is provided at a position corresponding to a primary temperature control boundary between the first intermediate molding region and the third intermediate molding region, and the temperature of the first intermediate molding region and the temperature of the second intermediate molding region may be controlled in the primary blow molding step while insulating the first intermediate molding region and the second intermediate molding region at the primary temperature control boundary.

This makes it possible to more uniformly control the temperature of each of the first intermediate molding region and the second intermediate molding region of the intermediate molded article to the preset temperature.

(2) In the blow molding method,
wherein the primary blow mold may further include a third primary temperature control section that controls the temperature of a third intermediate molding region that is situated between the first intermediate molding region and the second intermediate molding region, and
wherein the third primary temperature control section may control the temperature of the third intermediate molding region in the primary blow molding step to a temperature between a temperature set to the first primary temperature control section and a temperature set to the second primary temperature control section.

Since the temperature of the third intermediate molding region of the intermediate molded article is controlled to a temperature that is higher than the temperature of the first intermediate molding region and is lower than the temperature of the second intermediate molding region, the third intermediate molding region shrinks to a small extent as compared with the second intermediate molding region. Therefore, the first intermediate molding region and the third intermediate molding region that follows the first intermediate molding region can be placed at a specific cavity position in the secondary blow mold.

(3) In the blow molding method,
wherein the primary blow mold may include a first primary insulating layer that is provided at a position corresponding to a first primary temperature control boundary between the first intermediate molding region and the third intermediate molding region, and a second primary insulating layer that is provided at a position corresponding to a second primary temperature control boundary between the second intermediate molding region and the third intermediate molding region, and
wherein the temperature of the first intermediate molding region, the temperature of the second intermediate molding region, and the temperature of the third intermediate molding region of the intermediate molded article may be controlled in the primary blow molding step while insulating the first intermediate molding region, the second intermediate molding region, and the third intermediate molding region at the first primary temperature control boundary and the second primary temperature control boundary.

This makes it possible to more uniformly control the temperature of the first intermediate molding region, the second intermediate molding region, and the third intermediate molding region of the intermediate molded article to the preset temperature.

(4) In the blow molding method,
wherein the secondary blow mold may include a first secondary temperature control section and a second secondary temperature control section that are defined by dividing the secondary temperature control section in the vertical stretch direction, and
wherein the secondary blow molding step may cool a first final molding region of the final molded article that follows the neck, using the first secondary temperature control section, and may control the temperature of a second final molding region of the final molded article that has been blow-molded, using the second secondary temperature control section.

According to this configuration, the shaping capability and the degree of crystallinity in the second final molding region can be improved by controlling the temperature of the second final molding region subjected to secondary blow molding in the secondary blow mold using the second secondary temperature control section. The first final molding region is not stretched, and the shaping capability in the second final molding region that is subjected to secondary blow molding can be improved by cooling the first final molding region using the first secondary temperature control section.

The secondary blow mold may include a secondary insulating layer that is provided at a position corresponding to a secondary temperature control boundary between the first final molding region and the second final molding region, and the temperature of the first final molding region and the temperature of the second final molding region may be controlled in the secondary blow molding step while insulating the first final molding region and the second final molding region at the secondary temperature control boundary.

This makes it possible to more uniformly control the temperature of each of the first final molding region and the second final molding region of the final molded article to the preset temperature.

(5) In the blow molding method,
wherein the secondary blow mold may further include a third secondary temperature control section that controls the temperature of a third final molding region that is situated between the first final molding region and the second final molding region, and wherein the third secondary temperature control section may control the temperature of the third final molding region in the secondary blow molding step to a temperature higher than a temperature set to the first secondary temperature control section.

The shaping capability and the degree of crystallinity in the third final molding region that is subjected to secondary blow molding can be improved by allowing the third secondary temperature control section to control the temperature of the third final molding region to a temperature higher than the temperature set to the first secondary temperature control section.

In the secondary blow molding step, the third secondary temperature control section may control the temperature of the third final molding region to a temperature higher than the temperature set to the second secondary temperature control section.

The shaping capability and the degree of crystallinity in the third final molding region can be further improved by allowing the third secondary temperature control section to control the temperature of the third final molding region to a temperature higher than the temperature set to the second secondary temperature control section.

(6) In the blow molding method, wherein the secondary blow mold may include a first secondary insulating layer that is provided at a position corresponding to a first secondary temperature control boundary between the first final molding region and the third final molding region, and a second secondary insulating layer that is provided at a position corresponding to a second secondary temperature control boundary between the second final molding region and the third final molding region, and the temperature of the first final molding region, the temperature of the second final molding region, and the temperature of the third final molding region may be controlled in the secondary blow molding step while insulating the first final molding region, the second final molding region, and the third final molding region at the first secondary temperature control boundary and the second secondary temperature control boundary.

This makes it possible to more uniformly control the temperature of each of the first final molding region, the second final molding region, and the third final molding region of the final molded article to the preset temperature.

A thread may be formed (shaped) in the third final molding region of the final molded article.

A wide-mouth container in which the third final molding region having the thread forms the neck can be produced by cutting off the first final molding region. Since the second final molding region and the third final molding region have been blow-molded twice, the second final molding region and the third final molding region have heat resistance. Since the third final molding region has been blow-molded, the third final molding region has a diameter larger than that of the original neck. Therefore, a wide-mouth heat-resistant container can be produced.

(7) In the blow molding method, the third final molding region of the final molded article may be blow-molded to have a thread shape only in the secondary blow molding step.

Since the temperature of the second intermediate molding region of the intermediate molded article is controlled using the primary blow mold, the shaping capability when blow-molding the second intermediate molding region that holds heat into the third final molding region by secondary blow molding is improved. Therefore, the thread can be formed in the third final molding region only by the secondary blow molding step.

(8) In the blow molding method, wherein the primary blow molding step may form an irregular pattern that corresponds to a thread in the second intermediate molding region, and wherein the third final molding region of the final molded article may be blow-molded to have the thread shape in the secondary blow molding step.

The shaping capability when forming the thread in the third final molding region in the secondary blow molding step is further improved by forming the preliminary thread in the third intermediate molding region in the primary blow molding step. Moreover, since the first intermediate molding region does not shrink, the preliminary thread formed in the third intermediate molding region of the intermediate molded article can be placed at the corresponding cavity position in the secondary blow mold.

(9) In the blow molding method, wherein the primary blow molding step may form an orientation section in the first intermediate molding region, the orientation section indicating a direction of the intermediate molded article around a vertical axis, and wherein the secondary blow molding step may position the intermediate molded article in a rotation direction around the vertical axis using the orientation section.

The third intermediate molding region in which the preliminary thread is formed does not have rotational symmetry with respect to an arbitrary rotation angle around the vertical axis. The third intermediate molding region in which the preliminary thread is formed can be positioned in the rotation direction around the vertical axis using the orientation section formed in the first intermediate molding region of the intermediate molded article. Therefore, the preliminary thread can be placed at the corresponding cavity position in the secondary blow mold.

(10) According to another aspect of the invention, there is provided a blow mold that is used for primary blow molding that blow-molds a preform into an intermediate molded article, or secondary blow molding that blow-molds the intermediate molded article into a final molded article, the blow mold comprising:

a first temperature control section and a second temperature control section that are divided in a vertical stretch direction, wherein the first temperature control section cools a first molding region of the intermediate molded article or the final molded article that follows a neck, and wherein the second temperature control section controls the temperature of a second molding region that follows the first molding region to a temperature higher than a temperature set to the first temperature control section.

According to this aspect of the invention, the molding quality during primary blow molding or secondary blow molding can be improved by controlling the temperature of each of the first molding region and the second molding region of the intermediate molded article or the final molded article as described above. For example, since the first molding region (first intermediate molding region) of the intermediate molded article does not shrink when the first molding region (first intermediate molding region) is cooled, the shaft amount of a specific part of the second molding region (second intermediate molding region) in the vertical axis direction can be reduced, and the second molding region (second intermediate molding region) can be easily positioned with respect to a specific cavity position in the secondary blow mold. When the first molding region (first final molding region) of the final molded article is cooled, the first molding region (first final molding region) is not blow-molded, and the shaping capability in the second molding region (second final molding region) can be improved. The stretch capability and the shaping capability in the second molding region (second intermediate molding region or second final molding region) can be improved by controlling the temperature of the second molding region to a temperature higher than the temperature set to the first temperature control section.

Note that an insulating layer may be provided at a position corresponding to the boundary between the first molding region and the second molding region.

This makes it possible to more uniformly control the temperature of each of the first molding region and the second molding region of the intermediate molded article or the final molded article to the preset temperature.

(11) The blow mold may further comprise:

a third temperature control section that controls the temperature of a third molding region that is situated between the first molding region and the second molding region, wherein the third temperature control section may control the temperature of the third intermediate molding region to a temperature that is higher than the temperature set to the first temperature control section and differs from the temperature set to the second temperature control section.

This makes it possible to control the temperature corresponding to the second molding region and the third molding region. For example, the temperature of the third molding region (third intermediate molding region) of the intermediate molded article may be controlled to a temperature that is higher than the temperature of the first molding region (first intermediate molding region) and is lower than the temperature of the second molding region (second intermediate molding region). In this case, the third molding region (third intermediate molding region) shrinks to a small extent as compared with the second molding region (second intermediate molding region). Therefore, the first molding region (first intermediate molding region) and the third molding region (third intermediate molding region) that follows the first molding region can be placed at a specific cavity position in the secondary blow mold. The shaping capability and the degree of crystallinity in the third molding region (third final molding region) subjected to secondary blow molding can be improved by allowing the third temperature control section to control the temperature of the third molding region (third final molding region) of the final molded article to a temperature higher than the temperature set to the second temperature control section.

(12) The blow mold may further comprise:

a first insulating layer that is provided at a position corresponding to a first boundary between the first molding region and the third molding region; and a second insulating layer that is provided at a position corresponding to a second boundary between the second molding region and the third molding region.

This makes it possible to more uniformly control the temperature of each of the first molding region, the second molding region, and the third molding region of the intermediate molded article or the final molded article to the preset temperature.

(13) According to another aspect of the invention, there is provided a blow-molded container comprising:

a neck that is open;
a body that follows the neck; and
a bottom that follows the body, the neck, the body, and the bottom being shaped by primary blow molding and secondary blow molding, and traces that occurred due to insulation during the primary blow molding and the secondary blow molding appearing on an outer circumferential surface of the blow-molded container at a boundary between the neck and the body as two lines that continue in a circumferential direction.

The container according to this aspect of the invention is obtained by cutting off the first final molding region of the final molded article obtained using the method according to one aspect of the invention (see (6)). The neck corresponds to the third final molding region, and at least the body corresponds to the second final molding region. Therefore, the neck and the body have been subjected to primary blow molding and secondary blow molding, and the container can be used as a wide-mouth heat-resistant container. A trace that occurred due to insulation during primary blow molding and secondary blow molding appears on the outer circumferential surface of the container at the boundary between the neck (third final molding region) and the body (second final molding region) as two lines that continue in the circumferential direction. This is because the trace that occurred due to insulation during primary blow molding is shifted toward the neck due to shrinkage, and does not coincide with the trace that occurred due to insulation during secondary blow molding. Therefore, the blow-molded container that has two lines that continue in the circumferential direction on the outer circumferential surface at the boundary between the neck and the body can achieve the advantageous effects obtained by the method according to one aspect of the invention (see (6)). Note that the two lines that continue in the circumferential direction are thin lines that are not easily observed, and do not impair the external quality (external appearance) of the final molded article.

(14) In the blow-molded container, further comprising:

four parting lines that extend on the neck, the body, and the bottom in a vertical axis direction and are occurred due to the primary blow molding and the secondary blow molding appearing on the neck, the body, and the bottom.

When the molded article disposed in each of the primary blow mold and the secondary blow mold is shifted in position in the rotation direction around the vertical axis, two parting lines that occurred due to the primary blow mold do not coincide with two parting lines that occurred due to the secondary blow mold. Specifically, the molded article disposed in each of the primary blow mold and the secondary blow mold may be shifted in position in the rotation direction around the vertical axis (i.e., easier molding conditions are employed). The four parting lines do not impair the external quality (external appearance) of the final molded article. When the molding method described above (see (9)) is performed, the parting surface does not strictly coincide between the primary blow mold and the secondary blow mold. In this case, four parting lines also occur.

DESCRIPTION OF EMBODIMENTS

Exemplary embodiments of the invention are described in detail below. Note that the following exemplary embodiments do not in any way limit the scope of the invention defined by the claims laid out herein. Note also that all of the elements described below in connection with the exemplary embodiments should not necessarily be taken as essential elements of the invention.

1. Outline of Two-Step Blow Molding Method and Device

Figure 1:
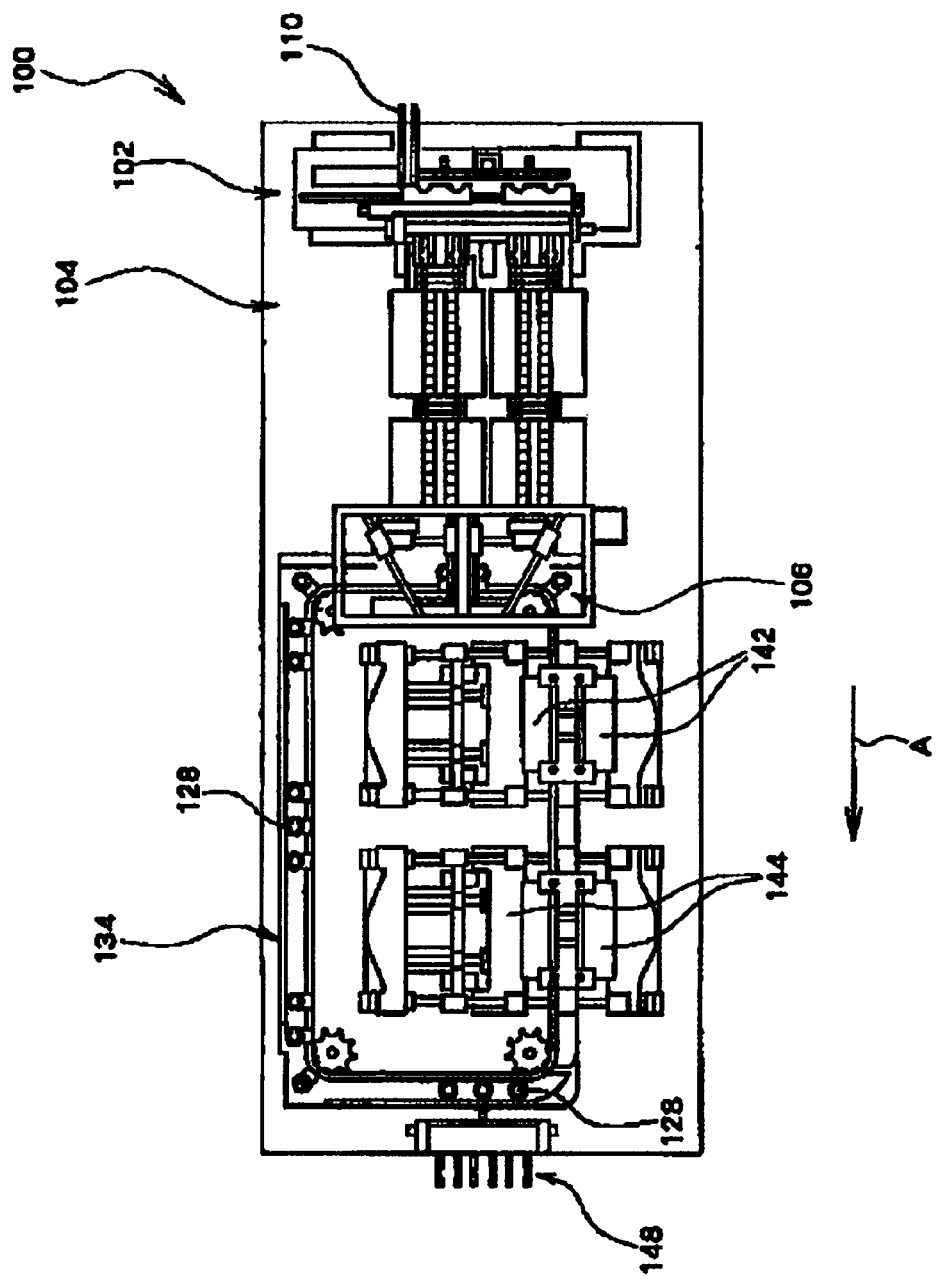
FIG. 1 is a schematic plan view illustrating a blow molding device that implements a blow molding method according to one embodiment of the invention.
Figure 2:
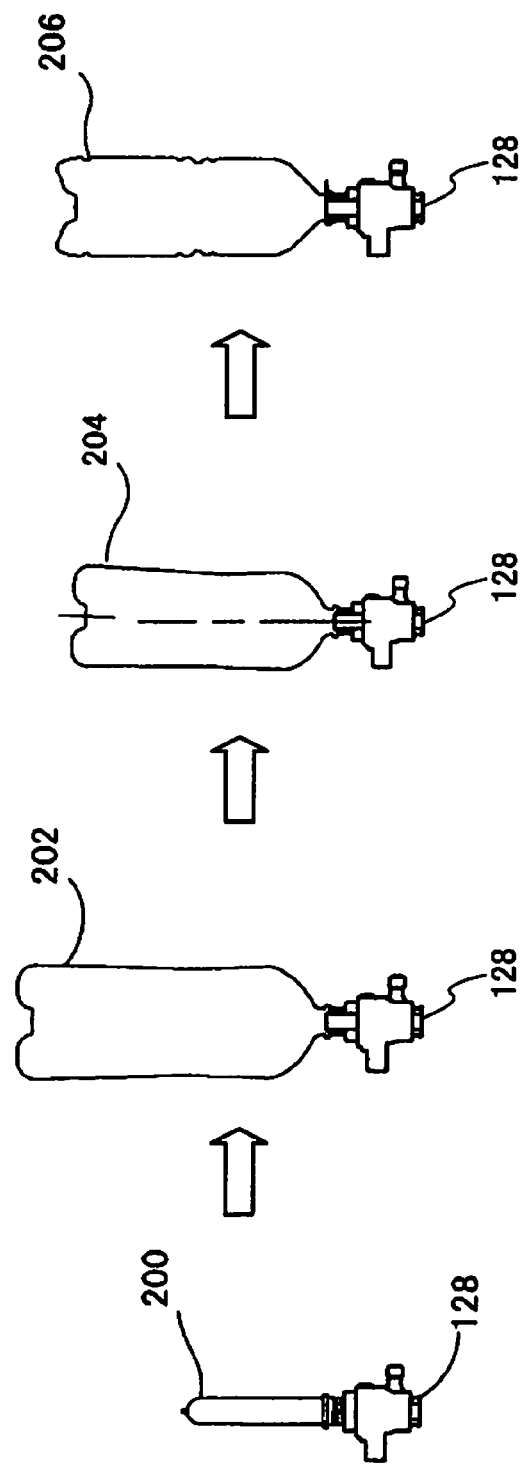
FIG. 2 is a view illustrating a preform, an intermediate molded article, a shrunken intermediate molded article, and a final molded article that are transferred by the blow molding device illustrated in FIG. 1.

FIG. 1 is a plan view illustrating the overall configuration of a blow molding device that implements a blow molding method according to one embodiment of the invention. FIG. 2 illustrates a preform, an intermediate molded article obtained by blow-molding the preform, the intermediate molded article that has shrunken, and a final molded article.

A blow molding device 100 produces a heat-resistant container (i.e., final molded article 206), and has a configuration in which a preform supply section 102, a heating station 104, a transfer section 106, and a blow transfer path 134 are linearly disposed along a preform transfer direction A.

The heat-resistant container is molded by the following steps. Specifically, a preform 200 is supplied to the preform supply section 102 from the outside of the blow molding device 100 through a chute 110. The preform 200 is transferred to the heating station 104, and heated to an optimum molding temperature using a heater. The preform 200 is mounted on a transfer member 128 through the transfer section 106 and the blow transfer path 134. The preform 200 is transferred to a primary blow mold 142 using the transfer member 128, and subjected to biaxial stretch blow molding. The blow mold is heated in the primary blow mold 142 to perform a heat treatment.

An intermediate molded article 202 obtained by primary blow molding has expanded to be larger than the final molded article 206, and is subjected to the heat treatment. The intermediate molded article 202 shrinks when blow air is discharged. An intermediate molded article 204 that has shrunken to have a total height smaller than that of the final molded article 206 is thus obtained. The intermediate molded article 204 is transferred to a secondary blow mold 144, and blow-molded into the final molded article 206. The final molded article 206 is removed from the blow molding device 100 using a removal section 148.

2. First Embodiment

A method according to a first embodiment of the invention is described below with reference to FIGS. 3 to 8.

2.1. Primary Blow Molding Step and Primary Blow Mold

Figure 3:
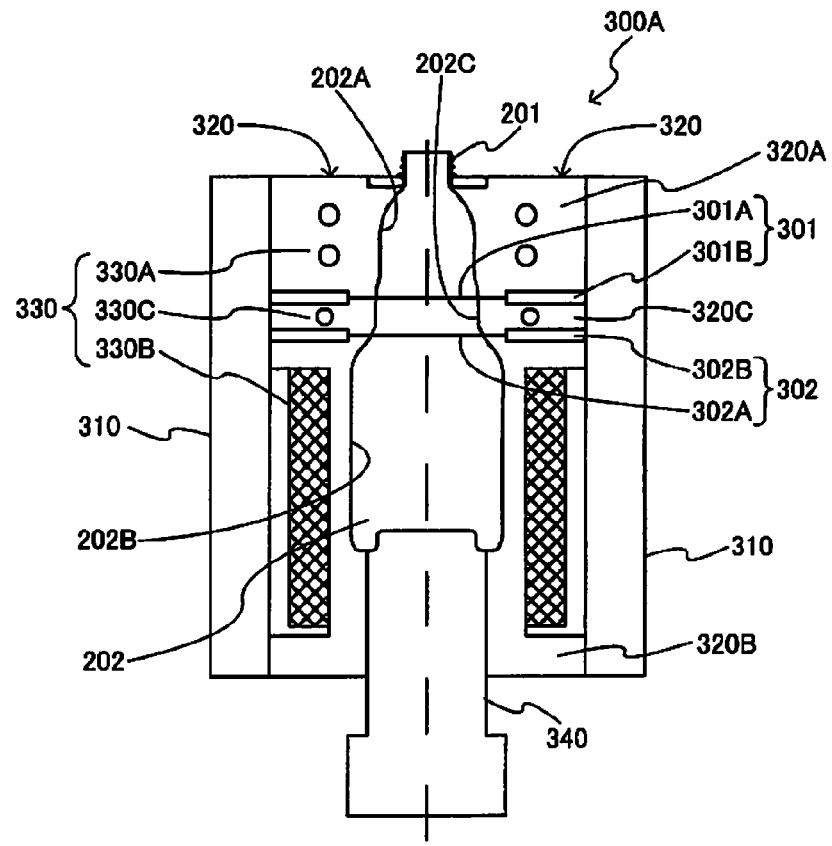
FIG. 3 is a view illustrating a primary blow molding step according to a first embodiment of the invention.

FIG. 3 illustrates a primary blow molding step that utilizes a primary blow mold 300A. The primary blow mold 300A includes a pair of primary blow split molds 320, and one bottom mold 340, the pair of primary blow split molds 320 being respectively secured on two holding plates 310. Note that the bottom mold 340 is used to form a bottom shape that is depressed inward in the primary blow molding step. The bottom mold 340 is unnecessary when such a bottom shape is not formed. Although FIG. 3 illustrates a state in which the intermediate molded article 202 is subjected to primary blow molding in an upright state in which a neck 201 is positioned on the upper side, the intermediate molded article 202 is subjected to primary blow molding in an inverted state when using the blow molding device 100 illustrated in FIG. 1.

Each of the pair of primary blow split molds 320 includes a primary temperature control section 330. The primary temperature control section 330 is divided into a plurality of sections in the vertical stretch direction. In the first embodiment, the primary temperature control section 330 is divided into a first primary temperature control section 330A, a second primary temperature control section 330B, and a third primary temperature control section 330C.

The first primary temperature control section 330A cools a first intermediate molding region 202A of the intermediate molded article 202 that follows the neck 201. The temperature of the preform 200 (e.g., a preform made of polyethylene terephthalate (PET)) (that has been heated to the optimum blow temperature) during primary blow molding is about 100 to 110° C., for example. The first primary temperature control section 330A may be implemented by a flow passage through which a refrigerant (e.g., water at room temperature) is circulated.

The second primary temperature control section 330B heats a second intermediate molding region 202B (including the body) of the intermediate molded article 202 that follows the bottom. The second primary temperature control section 330B may be implemented by a cartridge heater that heats the second intermediate molding region 202B at about 195° C., for example.

The third primary temperature control section 330C controls the temperature of a third intermediate molding region 202C of the intermediate molded article 202 that is situated between the first intermediate molding region 202A and the second intermediate molding region 202B to a temperature between the temperature set to the first primary temperature control section 330A and the temperature set to the second primary temperature control section 330B. The third primary temperature control section 330C may be implemented by a flow passage through which a temperature control medium (e.g., hot oil) at about 90 to 100° C. is circulated, for example.

The preform 200 of which the neck 201 is held by the transfer member 128 illustrated in FIG. 2 is disposed in the primary blow mold 300A in an open state, and the pair of primary blow split molds 320 and the bottom mold 340 are clamped. Primary blow air is introduced into the preform 200 through the transfer member 128 in a clamped state, and the preform 200 is stretched in the vertical axis direction using a primary stretching rod (not illustrated in FIG. 3) to implement the primary blow molding step. The outer wall of the intermediate molded article 202 comes in pressure contact with the cavity surface of the primary blow mold 300A. The cavity surface of the primary blow mold 300A controls the temperature of the intermediate molded article 202 to the temperatures set to the first primary temperature control section 330A, the second primary temperature control section 330B, and the third primary temperature control section 330C.

The primary blow mold 300A may further include a first primary insulating layer 301 and a second primary insulating layer 302. The first primary insulating layer 301 is provided at a position corresponding to a first primary temperature control boundary between the first intermediate molding region 202A and the third intermediate molding region 202C. The second primary insulating layer 302 is provided at a position corresponding to a second primary temperature control boundary between the second intermediate molding region 202B and the third intermediate molding region 202C. The first primary temperature control section 330A and the third primary temperature control section 330C are thus insulated by the first primary insulating layer 301. Likewise, the second primary temperature control section 330B and the third primary temperature control section 330C are insulated by the second primary insulating layer 302.

The first intermediate molding region 202A is cooled. The third intermediate molding region 202C has a large thickness and is stretched to a small extent as compared with the second intermediate molding region 202B, and has a low degree of crystallinity as compared with the second intermediate molding region 202B. This is because the outer diameter of the third intermediate molding region 202C is smaller than the outer diameter of the second intermediate molding region 202B, and the third intermediate molding region 202C has a small horizontal axis stretch ratio as compared with the second intermediate molding region 202B. The second intermediate molding region 202B has a small thickness and is stretched to a large extent as compared with the third intermediate molding region 202C, and has a high degree of crystallinity as compared with the third intermediate molding region 202C. The temperature of the second intermediate molding region 202B and the third intermediate molding region 202C is controlled so that secondary blow molding can be implemented. In this case, the temperature of the second intermediate molding region 202B having a small thickness is controlled to a higher temperature as compared with the third intermediate molding region 202C having a large thickness.

In the first embodiment, the primary blow split mold 320 is divided into a first primary split mold 320A, a second primary split mold 320B, and a third primary split mold 320C. When the first primary split mold 320A, the second primary split mold 320B, and the third primary split mold 320C are secured on the holding plate 310, an air layer is formed at positions at which the first primary split mold 320A, the second primary split mold 320B, and the third primary split mold 320C are adjacent to each other. Therefore, the first primary insulating layer 301 can be formed by the air layer that is formed between the opposing surfaces of the first primary split mold 320A and the third primary split mold 320C. Likewise, the second primary insulating layer 302 can be formed by the air layer that is formed between the opposing surfaces of the second primary split mold 320B and the third primary split mold 320C. Note that the first primary insulating layer 301 and the second primary insulating layer 302 may be an insulating layer (e.g., insulating material layer) other than an air layer.

The first primary insulating layer 301 may include a narrow section 301A that opens through the cavity surface, and a wide section 301B other than the narrow section 301A. When the cavity surface is discontinuous, a trace of the discontinuous part appears on the blow-molded article as a line that continues in the circumferential direction. Such a trace line can be made inconspicuous by designing the first primary insulating layer 301 to include the narrow section 301A that opens through the cavity surface. Since the insulating effect decreases when the first primary insulating layer 301 is formed to include only the narrow section 301A, the insulating effect is improved by forming the wide section 301B. The second primary insulating layer 302 may also include a narrow section 302A that opens through the cavity surface, and a wide section 302B other than the narrow section 301A for the same reasons as described above.

2.2. Shrinkage Step

Figure 4:
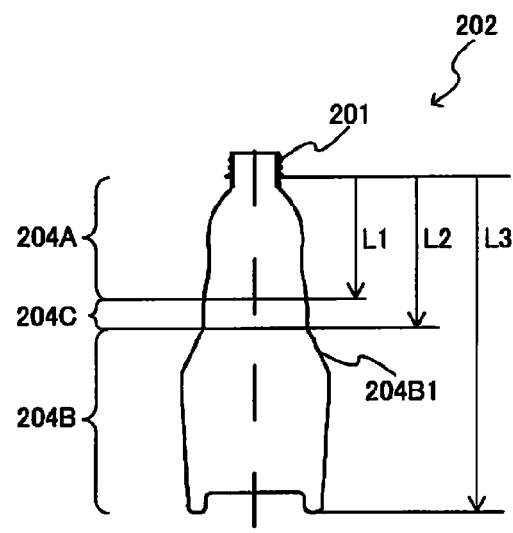
FIG. 4 is a view illustrating an intermediate molded article shrinkage step according to the first embodiment of the invention.

FIG. 4 illustrates a shrinkage step that is implemented by discharging the blow air from the intermediate molded article 202 that has been molded using the primary blow mold 300A. The intermediate molded article 204 has shrunken in the horizontal axis direction and the vertical axis direction as compared with the intermediate molded article 202 situated inside the primary blow mold 300A.

Shrinkage in the vertical axis direction is discussed below taking account of the relationship with the secondary blow molding step that is performed after the shrinkage step. Since the neck 201 illustrated in FIG. 4 is held by the transfer member 128, a vertical axis dimension L from the lower end of the neck 201 decreases due to shrinkage. The amount of shrinkage depends on the temperature controlled using the primary blow mold 300A.

The first intermediate molding region 202A, the second intermediate molding region 202B, and the third intermediate molding region 202C of which the temperature is respectively controlled by the first primary temperature control section 330A, the second primary temperature control section 330B, and the third primary temperature control section 330C respectively correspond to a first intermediate molding region 204A, a second intermediate molding region 204B, and a third intermediate molding region 204C of the intermediate molded article 204 illustrated in FIG. 4. It is considered that the first intermediate molding region 202A of the intermediate molded article 202 before shrinkage and the intermediate molding region 204A of the intermediate molded article 204 after shrinkage have a substantially identical dimension even if the intermediate molding region 204A has shrunken to some extent. This is because the first intermediate molding region 202A is cooled by the first primary temperature control section 330A. Therefore, it is considered that the distance L1 from the position right under the neck 201 (i.e., the starting point of the first intermediate molding region) to the end point of the first intermediate molding region is substantially identical between the intermediate molded article 202 before shrinkage and the intermediate molded article 204 after shrinkage.

The temperature of the third intermediate molding region 204C that follows the first intermediate molding region 204A is controlled by the third primary temperature control section 330C to a temperature higher than the temperature set to the first primary temperature control section 330A. Therefore, the third intermediate molding region 204C shrinks with respect to the position (substantial starting point) at the distance L1 from the position right under the neck 201.

However, the amount of shrinkage of the third intermediate molding region 204C decreases for the following reasons. Specifically, the starting point (i.e., the position at the distance L1 from the position right under the neck 201) substantially does not change. Second, the temperature set to the third primary temperature control section 330C is higher than the temperature set to the first primary temperature control section 330A, but is lower than the temperature set to the second primary temperature control section 330B. Third, the length of the third intermediate molding region 204C in the vertical axis direction is small. Therefore, almost no shrinkage occurs at the shrinkage (deformation) starting point of the third intermediate molding region 204C, and a change in the dimension from the starting point to the end point of the third intermediate molding region 204C is relatively small.

The temperature of the second intermediate molding region 204B that follows the third intermediate molding region 204C is controlled by the second primary temperature control section 330B to a temperature higher than the temperature set to the first primary temperature control section 330A and the temperature set to the third primary temperature control section 330C. Therefore, the second intermediate molding region 204B shrinks to a relatively large extent with respect to the position (starting point) at a distance L3 from the position right under the neck 201.

Note that a narrow part 204B1 of the second intermediate molding region 204B that is formed at a position close to the third intermediate molding region 204C shows a small change in dimension in the vertical axis direction. This is because a change in dimension in the vertical axis direction is small at a position (starting point) situated at a distance L2 from the position right under the neck 201, and is also small at a position close to the starting point.

2.3. Secondary Blow Molding Step and Secondary Blow Mold

Figure 5:
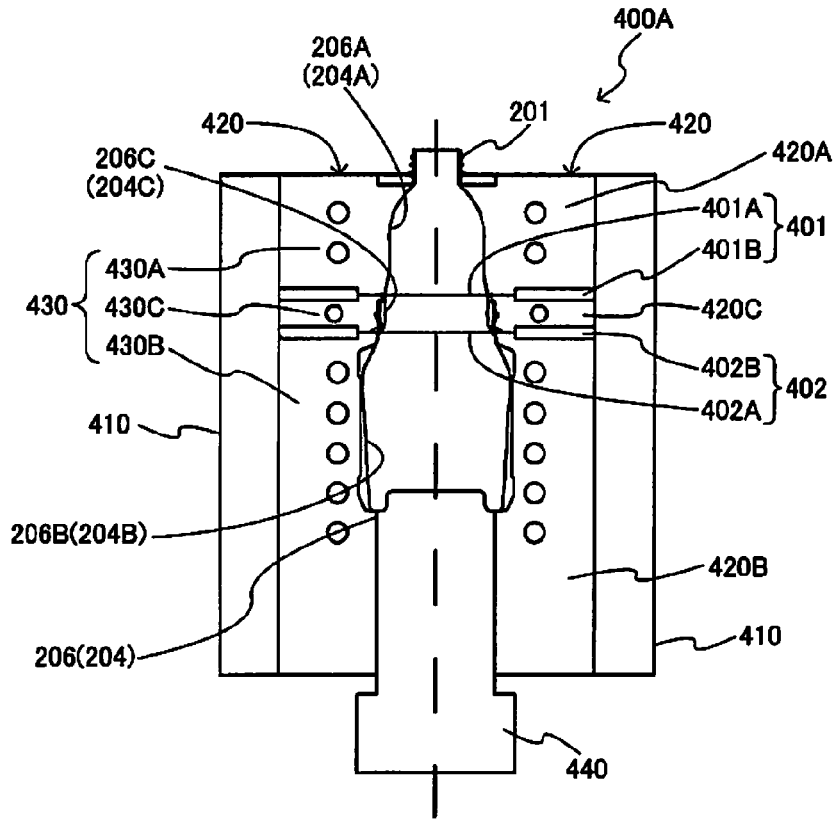
FIG. 5 is a view illustrating a secondary blow molding step according to the first embodiment of the invention.
Figure 6:
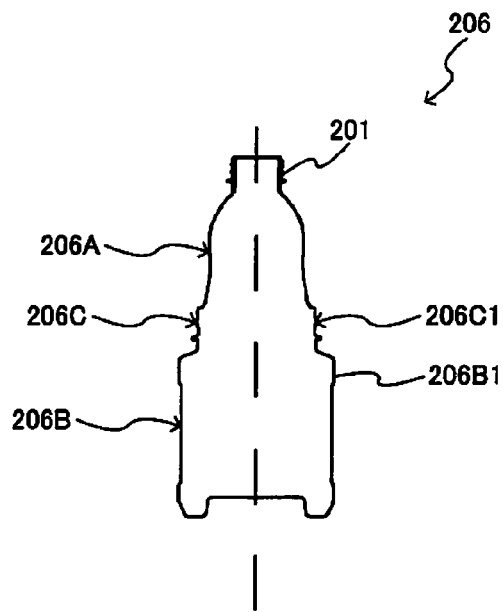
FIG. 6 is a view illustrating a final molded article that is molded according to the first embodiment of the invention.

FIG. 5 illustrates a secondary blow molding step that utilizes a secondary blow mold 400A, and FIG. 6 illustrates the final molded article 206 obtained by secondary blow molding. The secondary blow mold 400A includes a pair of secondary blow split molds 420, and a bottom mold 440, the pair of secondary blow split molds 420 being respectively secured on two holding plates 410. Note that the bottom mold 440 is used to provide the final molded article 206 with a bottom shape (champagne bottle-like bottom shape). The bottom mold 440 is unnecessary when such a bottom shape is not formed. Although FIG. 5 illustrates a state in which the final molded article 206 is molded by secondary blow molding in an upright state in which the neck 201 is positioned on the upper side, the final molded article 206 is molded by secondary blow molding in an inverted state when using the blow molding device 100 illustrated in FIG. 1.

Each of the pair of secondary blow split molds 420 includes a secondary temperature control section 430. The secondary temperature control section 430 is divided into a plurality of sections in the vertical stretch direction. In the first embodiment, the secondary temperature control section 430 is divided into a first secondary temperature control section 430A, a second secondary temperature control section 430B, and a third secondary temperature control section 430C.

The first secondary temperature control section 430A cools a first final molding region 206A of the final molded article 206 that follows the neck 201. The first final molding region 206A is not stretched, and a capability to shape a second final molding region 206B and a third final molding region 206C through secondary blow molding can be improved by cooling the first final molding region 206A using the first secondary temperature control section 430A. The first secondary temperature control section 430A may be implemented by a flow passage through which a refrigerant (e.g., water at room temperature) is circulated, in the same manner as the first primary temperature control section 330A.

The second secondary temperature control section 430B controls the temperature of a second final molding region 206B (including the body) of the final molded article 206 that follows the bottom. The second secondary temperature control section 430B may be implemented by a flow passage through which a temperature control medium (e.g., hot oil) at a temperature (e.g., about 100° C.) higher than the temperature set to the first secondary temperature control section 430A is circulated.

The third secondary temperature control section 430C controls the temperature of the third final molding region 206C of the final molded article 206 that is situated between the first final molding region 206A and the second final molding region 206B to a temperature higher than the temperature set to the first secondary temperature control section 430A. When providing the third final molding region 206C with a concavo-convex shape (e.g., thread 206C1), the third secondary temperature control section 430C may control the temperature of the third final molding region 206C to a temperature higher than the temperature set to the second secondary temperature control section 430B. In the first embodiment, the third secondary temperature control section 430C may be implemented by a rod-like cartridge heater that heats the third final molding region 206C at about 130° C., for example.

The intermediate molded article 204 (that has shrunken) of which the neck 201 is held by the transfer member 128 illustrated in FIG. 2 is disposed in the secondary blow mold 400A in an open state, and the pair of secondary blow split molds 420 and the bottom mold 440 are clamped. Secondary blow air is introduced into the intermediate molded article 204 through the transfer member 128 in a clamped state, and the intermediate molded article 204 is stretched in the vertical axis direction using a secondary stretching rod (not illustrated in FIG. 5) to implement the secondary blow molding step. Note that the secondary stretching rod may not be caused to come in contact with the intermediate molded article 204, and may be used only as a cooling (circulating) air supply channel. The outer wall of the final molded article 206 comes in pressure contact with the cavity surface of the secondary blow mold 400A. The cavity surface of the secondary blow mold 400A controls the temperature of the final molded article 206 to the temperatures set to the first secondary temperature control section 430A, the second secondary temperature control section 430B, and the third secondary temperature control section 430C.

As illustrated in FIG. 5, the third intermediate molding region 204C of the intermediate molded article 204 (that has shrunken) can be subjected to secondary blow molding in the secondary blow mold 400A in a clamped state based on the vertical axis dimensional relationship described above with reference to FIG. 4 to form the third final molding region 206C of the final molded article 206. The narrow part 204B1 formed in the second intermediate molding region 204B can be disposed corresponding to the cavity surface that forms a narrow part 206B1 of the final molded article 206 based on the vertical axis dimensional relationship described above with reference to FIG. 4. Since the first intermediate molding region 204A of the intermediate molded article 204 shrinks to only a small extent, each part of the intermediate molded article 204 can be disposed corresponding to the corresponding cavity surface of the secondary blow mold 400A. This makes it possible to easily design the primary blow mold 300A.

Since the third secondary temperature control section 430C can control the temperature of the third final molding region 206C to a temperature higher than the temperature set to the second secondary temperature control section 430B, the capability to shape the third intermediate molding region 204C can be improved when blow-molding the third intermediate molding region 204C that has a large thickness and has a high heat-holding capability to provide the third final molding region 206C with an irregular shape (e.g., thread 206C1). When the third secondary temperature control section 430C controls the temperature of the third final molding region 206C to a temperature higher than the temperature set to the second secondary temperature control section 430B, the degree of crystallinity of the third final molding region 206C can be improved. This makes it possible to improve the heat resistance of the third final molding region 206C. Note that the third secondary temperature control section 430C need not necessarily control the temperature of the third final molding region 206C to a temperature higher than the temperature set to the second secondary temperature control section 430B.

Since the temperature of the second final molding region 206B is controlled by the second secondary temperature control section 430B after completion of secondary blow molding, a high degree of crystallinity can be maintained so that heat resistance is maintained.

The secondary blow mold 400A may further include a first secondary insulating layer 401 and a second secondary insulating layer 402 for the same reasons as described above in connection with the primary blow mold 300A. The first secondary insulating layer 401 is provided at a position corresponding to a first secondary temperature control boundary between the first final molding region 206A and the third final molding region 206C. The second secondary insulating layer 402 is provided at a position corresponding to a second secondary temperature control boundary between the second final molding region 206B and the third final molding region 206C. The first secondary temperature control section 430A and the third secondary temperature control section 430C are thus insulated by the first secondary insulating layer 401. Likewise, the second secondary temperature control section 430B and the third secondary temperature control section 430C are insulated by the second secondary insulating layer 402.

In the first embodiment, the secondary blow split mold 420 is divided into a first secondary split mold 420A, a second secondary split mold 420B, and a third secondary split mold 420C. When the first secondary split mold 420A, the second secondary split mold 420B, and the third secondary split mold 420C are secured on the holding plate 410, an air layer is formed at positions at which the first secondary split mold 420A, the second secondary split mold 420B, and the third secondary split mold 420C are adjacent to each other. Therefore, the first secondary insulating layer 401 can be formed by the air layer that is formed between the opposing surfaces of the first secondary split mold 420A and the third secondary split mold 420C. Likewise, the second secondary insulating layer 402 can be formed by the air layer that is formed between the opposing surfaces of the second secondary split mold 420B and the third secondary split mold 420C. Note that the first secondary insulating layer 401 and the second secondary insulating layer 402 may be an insulating layer (e.g., insulating material layer) other than an air layer.

The first secondary insulating layer 401 may include a narrow section 401A that opens through the cavity surface, and a wide section 401B other than the narrow section 401A. When the cavity surface is discontinuous, a trace of the discontinuous part appears on the blow-molded article as a line that continues in the circumferential direction. Such a trace line can be made inconspicuous by designing the first secondary insulating layer 401 to include the narrow section 401A that opens through the cavity surface. Since the insulating effect decreases when the first secondary insulating layer 401 is formed to include only the narrow section 401A, the insulating effect is improved by forming the wide section 401B. The second secondary insulating layer 402 may also include a narrow section 402A that opens through the cavity surface, and a wide section 402B other than the narrow section 401A for the same reasons as described above.

2.4. Final Molded Article and End Product

Figure 7:
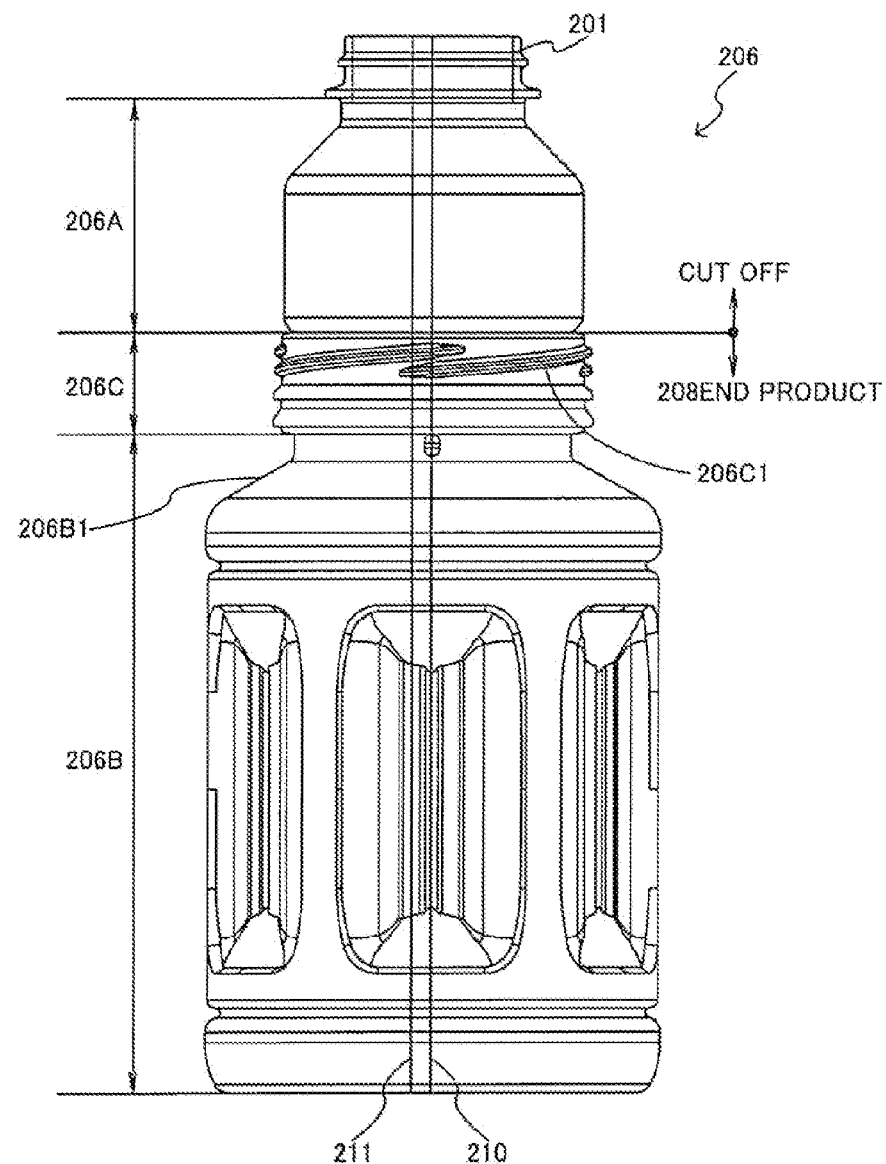
FIG. 7 is a view illustrating an example of a final molded article and an end product having parting lines formed by a primary blow mold and a secondary blow mold as a trace.

FIG. 7 illustrates a specific example of the final molded article 206 obtained by the blow molding method according to the first embodiment. The first final molding region 206A of the final molded article 206 is cut off. An end product 208 is thus obtained that includes the third final molding region 206C in which the thread 206C1 is formed as a neck, and includes the second final molding region 206B as a bottomed body that follows the neck. Since the neck formed by the third final molding region 206C that is obtained by blow molding is wider than the original neck 201, a wide-mouth container is obtained as the end product 208. Since the second final molding region 206B and the third final molding region 206C of the end product 208 are provided with heat resistance through two-step blow molding, the end product 208 can be used as a wide-mouth heat-resistant container.

As described above with reference to FIG. 1, the preform 200 and the intermediate molded article 204 are transferred in a state in which the neck 201 is held by the transfer member 128. The transfer member 128 is normally driven using a chain, and the preform 200 and the intermediate molded article 204 that are transferred (e.g., in an inverted state) can rotate around the vertical axis due to engagement clearance between the chain and the transfer member 128. The intermediate molded article 204 that has been molded by and removed from the primary blow mold 300A may be transferred from the transfer member 128 to another transfer member, differing from the blow molding device 100 illustrated in FIG. 1.

In such a case, four parting lines 210 and 211 (only two parting lines on the front side are illustrated in FIG. 7, and two parting lines are present on the rear side) appear on the outer circumferential surface of the final molded article 206 along the vertical axis direction. Specifically, when the preform 200 and the molded article 204 that are respectively disposed in the primary blow mold 300A and the secondary blow mold 400A are shifted in position in the rotation direction around the vertical axis, two parting lines that occurred due to the primary blow mold 300A do not coincide with two parting lines that occurred due to the secondary blow mold 400A. Specifically, whether or not the primary blow molding step and the secondary blow molding step according to the first embodiment have been performed can be determined by the presence or absence of the four parting lines 210 and 211.

Figure 8:
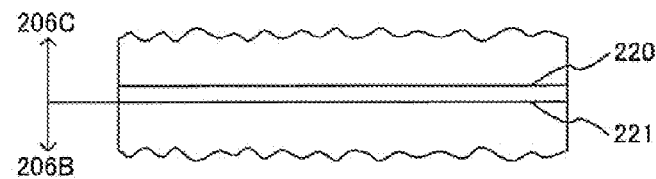
FIG. 8 is a view illustrating two continuous lines that occur on the outer circumferential surface of a final molded article due to an insulating layer in a primary blow molding step and a secondary blow molding step.

As illustrated in FIG. 8, a trace that occurred due to insulation during primary blow molding and secondary blow molding appears on the outer circumferential surface of the end product 208 around the boundary between the third final molding region 206C (i.e., neck) and the second final molding region 206B (i.e., body) as two lines 220 and 221 that continue in the circumferential direction. The upper line 220 illustrated in FIG. 8 is a trace of the second primary insulating layer (section) 302 of the primary blow mold 300A. The lower line 221 illustrated in FIG. 8 is a trace of the second secondary insulating layer (section) 402 of the secondary blow mold 400A. When the second primary insulating layer (section) 302 illustrated in FIG. 3 and the second secondary insulating layer (section) 402 illustrated in FIG. 5 are identical as to the distance from the position right under the neck 201, the line 220 that appeared on the intermediate molded article 202 before shrinkage is slightly shifted upward on the intermediate molded article 204 after shrinkage due to the shrinkage step illustrated in FIG. 4. Therefore, the two lines 220 and 221 appear on the end product 208. Specifically, whether or not the primary blow molding step and the secondary blow molding step according to the first embodiment have been performed can be determined by the presence or absence of the two lines 220 and 221 that continue in the circumferential direction.

3. Second Embodiment
3.1. Blow Molding Method and Blow Mold

A second embodiment of the invention is described below with reference to FIGS. 9 to 15. FIGS. 9 to 12 respectively illustrate a primary blow molding step, a shrinkage step, a secondary blow molding step, and a final molded article according to the second embodiment. In FIGS. 9 to 12, the same members as those illustrated in FIGS. 3 to 6 (first embodiment) are respectively indicated by the same reference signs, and description thereof is omitted.

Figure 9:
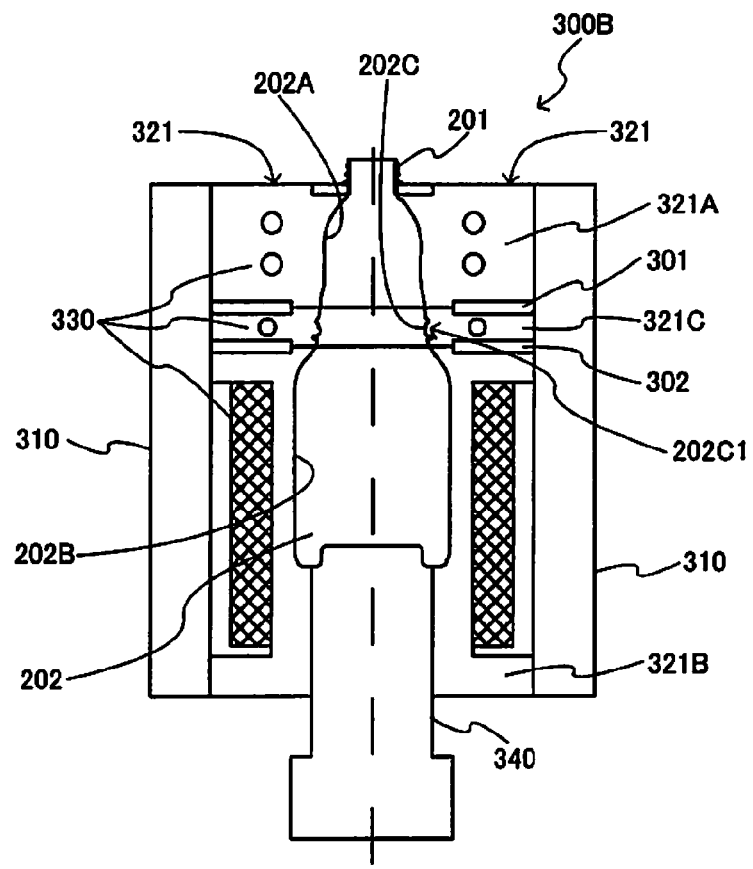
FIG. 9 is a view illustrating a primary blow molding step according to a second embodiment of the invention.

A primary blow mold 300B illustrated in FIG. 9 includes a pair of primary blow split molds 321. Each of the pair of primary blow split molds 321 is divided into a first primary split mold 321A, a second primary split mold 321B, and a third primary split mold 321C. The third primary split mold 321C has a cavity surface that forms a preliminary thread 202C1 in the third intermediate molding region 202C of the intermediate molded article 202. The primary blow split mold 321 is identical with the primary blow split mold 320 according to the first embodiment except for the above feature. The temperatures set to the first primary temperature control section 330A, the second primary temperature control section 330B, and the third primary temperature control section 330C are the same as those described above in connection with the first embodiment, for example.

Figure 10:
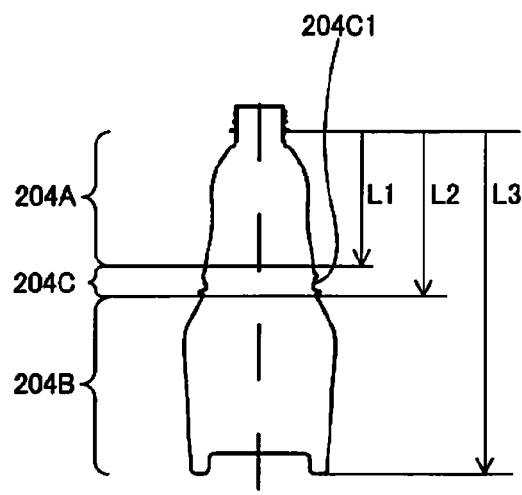
FIG. 10 is a view illustrating an intermediate molded article shrinkage step according to the second embodiment of the invention.

FIG. 10 illustrates the shrinkage step that is implemented by removing the intermediate molded article 202 from the primary blow mold 300B. The intermediate molded article 204 that has shrunken is illustrated in FIG. 10. The intermediate molded article 204 includes the preliminary thread 202C1 in the third intermediate molding region 204C. The dimensions L1 to L3 illustrated in FIG. 10 are almost the same as the dimensions L1 to L3 illustrated in FIG. 4.

Figure 11:
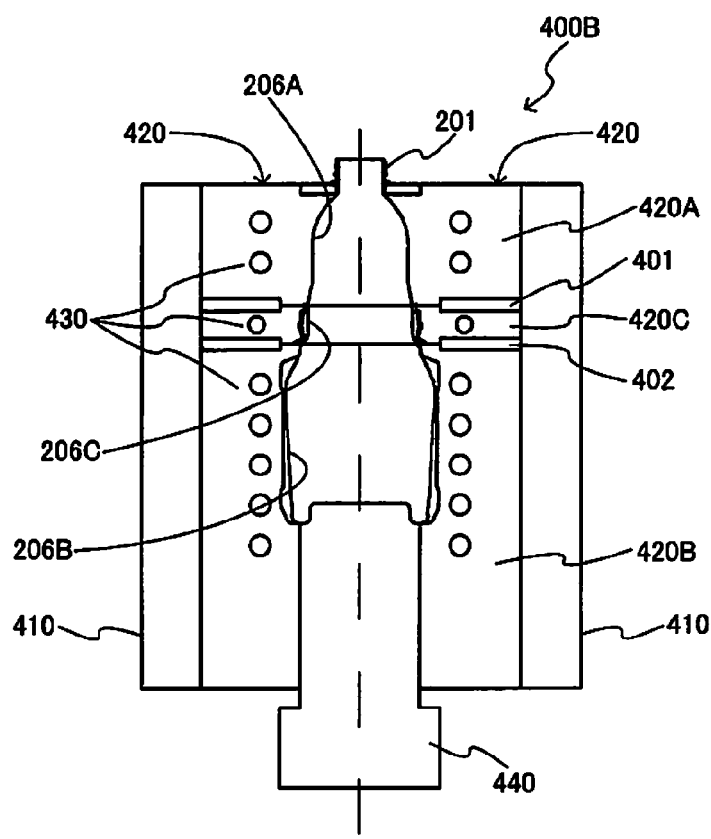
FIG. 11 is a view illustrating a secondary blow molding step according to the second embodiment of the invention.
Figure 12:
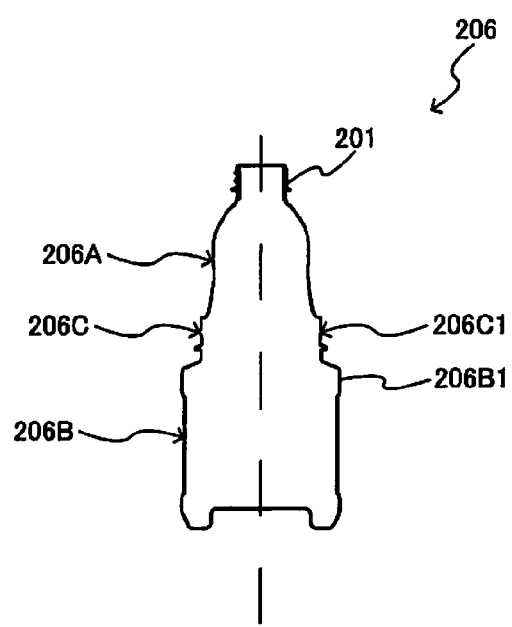
FIG. 12 is a view illustrating a final molded article that is molded according to the second embodiment of the invention.

FIG. 11 illustrates the secondary blow molding step that utilizes a secondary blow mold 400B, and FIG. 12 illustrates the final molded article 206 obtained by secondary blow molding. The secondary blow mold 400A according to the first embodiment illustrated in FIG. 5 may be used as the secondary blow mold 400B illustrated in FIG. 11, for example. Therefore, the final molded article 206 illustrated in FIG. 12 may have the same shape as that of the final molded article 206 illustrated in FIG. 6.

In the primary blow molding step illustrated in FIG. 9, the preliminary thread 202C1 is formed in the third intermediate molding region 202C of the intermediate molded article 202. This makes it possible to further improve the shaping capability when forming the thread 206C1 in the third final molding region 206C of the final molded article 206 in the secondary blow molding step illustrated in FIG. 11.

A preliminary thread 204C1 is formed on the intermediate molded article 204 (that has shrunken) illustrated in FIG. 10. The dimensions L1 and L2 illustrated in FIG. 10 are almost the same as the dimensions L1 and L2 illustrated in FIG. 4. Therefore, the preliminary thread 204C1 can be accurately positioned with respect to the cavity surface that forms the thread 206C1 when the intermediate molded article 204 is clamped in the secondary blow mold 400B.

3.2. Orientation Section

In the second embodiment, the preliminary thread 202C1 is formed in the third intermediate molding region 202C of the intermediate molded article 202, and the preliminary thread 204C1 is formed in the third intermediate molding region 204C of the intermediate molded article 204. The preliminary threads 202C1 and 204C1 need not be sharply formed as compared with the thread 206C1 of the final molded article 206 illustrated in FIG. 7. However, the preliminary threads 202C1 and 204C1 have an irregular shape that corresponds to the thread 206C1. Therefore, the third intermediate molding region 202C in which the preliminary thread 202C1 is formed, and the third intermediate molding region 204C in which the preliminary thread 204C1 is formed do not have rotational symmetry with respect to an arbitrary rotation angle around the vertical axis of the intermediate molded article 202 or 204. Specifically, it is necessary to position the intermediate molded article 204 around the vertical axis of the intermediate molded article 204 when disposing the intermediate molded article 204 having the preliminary thread 204C1 in the secondary blow mold 400B. If the intermediate molded article 204 is not positioned around the vertical axis of the intermediate molded article 204, the preliminary thread 204C1 does not coincide with the cavity surface that forms the thread 206C1.

Figure 13:
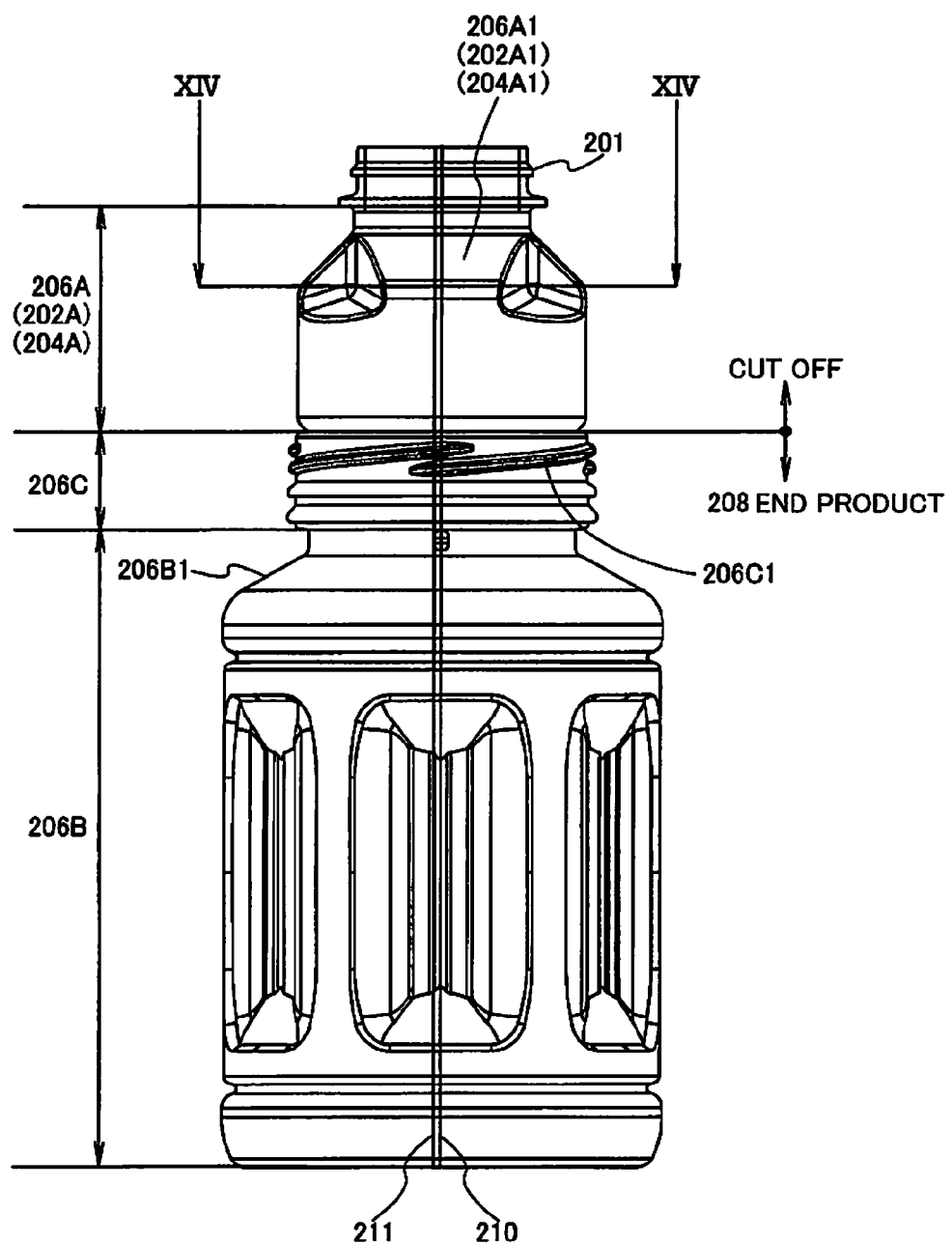
FIG. 13 is a view illustrating an example of a final molded article having an orientation section.

Therefore, it is preferable to form an orientation section 202A1 (204A1) in the first intermediate molding region 202A (204A) of the intermediate molded article 202 (204) (see FIG. 13). An orientation section 206A1 that remains in the first final molding region 206A of the final molded article 206 has the same shape as that of the orientation section 202A1 (204A1). Specifically, the primary blow mold 300B and the secondary blow mold 400B have a cavity surface that corresponds to the orientation section 202A1 or 206A1.

Figure 14:
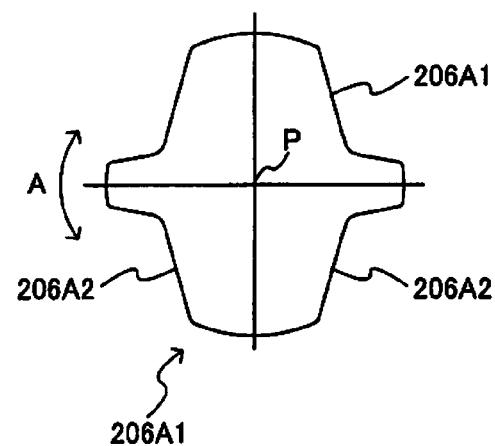
FIG. 14 is a cross-sectional view taken along the line XIIII-XIIII illustrated in FIG. 13.
Figure 15:
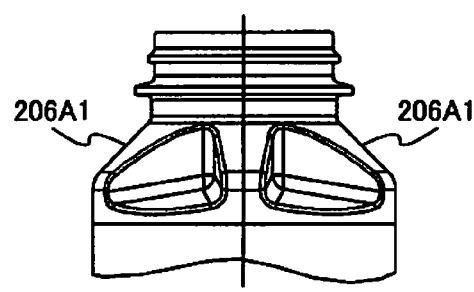
FIG. 15 is a side view illustrating part of a final molded article illustrated in FIG. 13 around a neck.

FIG. 14 illustrates the cross section taken along the line XIIII-XIIII illustrated in FIG. 13. FIG. 15 is a side view illustrating the neck 201 and the orientation section 206A1 illustrated in FIG. 13. As illustrated in FIG. 14, the orientation section 206A1 (202A1, 204A1) has rotational symmetry only at a rotation angle of 180° around the vertical axis P. The orientation section 206A1 (202A1, 204A1) functions as a positioning part in the direction around the vertical axis. The intermediate molded article 204 can be positioned using the orientation section 204C1 so that the orientation section 204C1 formed on the intermediate molded article 204 coincides with the corresponding cavity surface of the secondary blow mold 400B.

For example, when the orientation section 206A1 (202A1) has a tapered surface 206A2 that is tapered toward the outside (slopes toward the outside) (see FIG. 14), the orientation section 204A1 is guided to the cavity surface when clamping the secondary blow mold 400B, and the intermediate molded article 204 can be positioned in the rotation direction around the vertical axis.

Note that it is difficult to achieve strict positioning to such an extent that a trace formed when clamping the secondary blow mold 400B coincides with a trace formed when clamping the primary blow mold 300B. Therefore, two parting lines 210 and 211 are formed on the front side at positions close to each other (see FIG. 13) (i.e., four parting lines in total remain on the front side and the back side as a trace). Accordingly, whether or not the final molded article 206 having the orientation section 206A1 was molded by primary blow molding and secondary blow molding can be determined based on whether or not the final molded article 206 has the parting lines 210 and 211 that are formed at positions close to each other (four parting lines in total on the front side and the back side).

4. Third Embodiment

FIGS. 16 to 19 illustrate a third embodiment in which the final molded article 206 described above in connection with the first embodiment and the second embodiment is molded. The third embodiment differs from the first embodiment and the second embodiment in that a primary blow mold 300C and a secondary blow mold 400C are divided into two zones instead of three zones. In FIGS. 16 to 19, members having the same functions as those described above in connection with the first embodiment and the second embodiment are indicated by the same reference signs, and description thereof is omitted.

Figure 16:
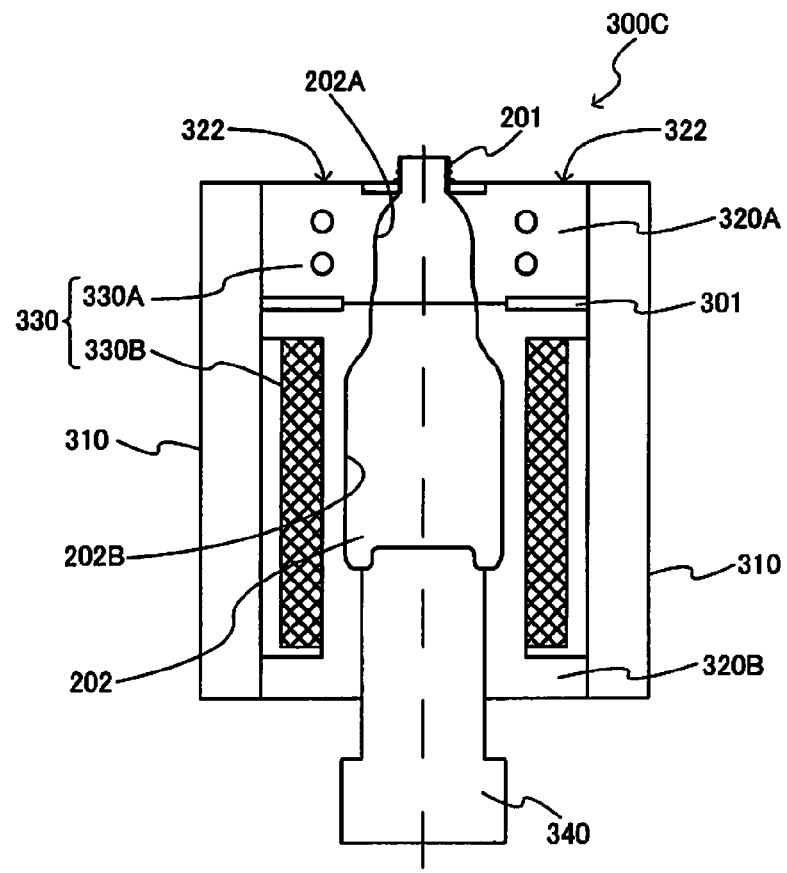
FIG. 16 is a view illustrating a primary blow molding step according to a third embodiment of the invention.
Figure 17:
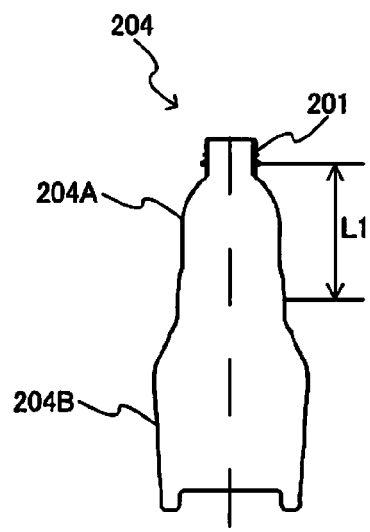
FIG. 17 is a view illustrating an intermediate molded article shrinkage step according to the third embodiment of the invention.

The primary blow mold 300C illustrated in FIG. 16 includes a first primary temperature control section 330A and a second primary temperature control section 330B that are divided in the vertical stretch direction. The first primary temperature control section 330A cools the first intermediate molding region 202A of the intermediate molded article 202 that follows the neck 201. The second primary temperature control section 330B controls the temperature of the second intermediate molding region 202B (including the body) of the intermediate molded article 202 that follows the bottom to a temperature higher than the temperature set to the first primary temperature control section 330A. In this case, the first intermediate molding region 202A of the intermediate molded article 202 illustrated in FIG. 16 shrinks to only a small extent, and the dimension L1 illustrated in FIG. 17 is almost identical between the intermediate molded article 202 before shrinkage and the intermediate molded article 204 after shrinkage. Therefore, the intermediate molded article 204 after shrinkage can be easily positioned with respect to the secondary blow mold 400C in the vertical axis direction, as described above in connection with the first embodiment and the second embodiment.

As illustrated in FIG. 16, the primary blow mold 300C may include an insulating layer 301 at a position corresponding to the boundary between the first intermediate molding region 202A and the second intermediate molding region 202B.

Figure 18:
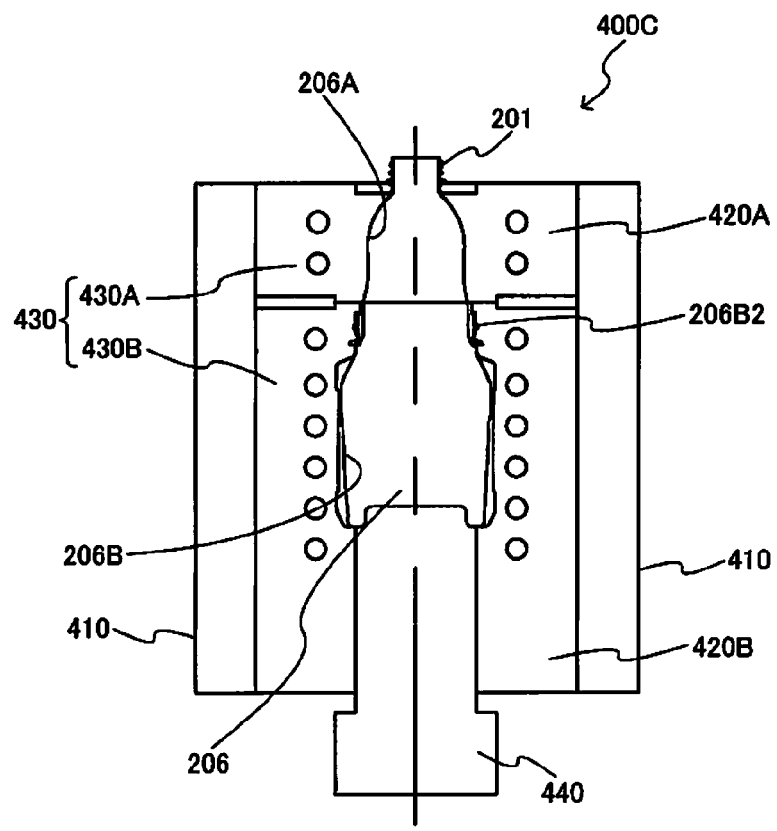
FIG. 18 is a view illustrating a secondary blow molding step according to the third embodiment of the invention.
Figure 19:
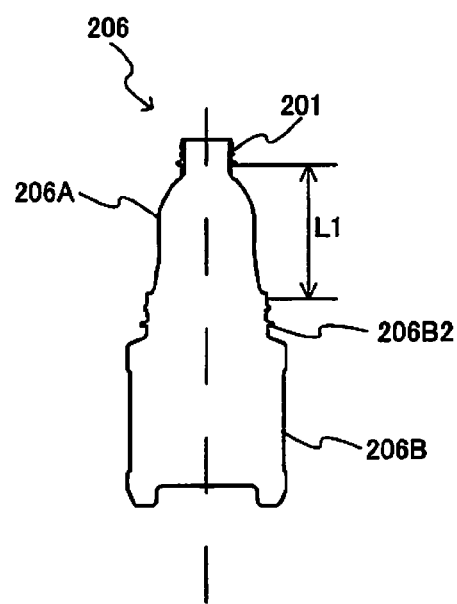
FIG. 19 is a view illustrating a final molded article that is molded according to the third embodiment of the invention.

The secondary blow mold 400C illustrated in FIG. 18 includes a first secondary temperature control section 430A and a second secondary temperature control section 430B that are divided in the vertical stretch direction. The first secondary temperature control section 430A cools the first final molding region 206A of the final molded article 206 that follows the neck 201. The second secondary temperature control section 430B controls the temperature of the second final molding region 206B (including the body) of the final molded article 206 that follows the bottom to a temperature higher than the temperature set to the first secondary temperature control section 430A.

In the final molded article 206 according to the third embodiment, the third final molding region 206C described above in connection with the first embodiment and the second embodiment is included in the second final molding region 206B. In the intermediate molded article 202 (204) according to the third embodiment, the third intermediate molding region 202C (204C) described above in connection with the first embodiment and the second embodiment is included in the second intermediate molding region 202B (204B). Therefore, a thread 206B2 of the final molded article 206 is formed in the second final molding region 206B. When forming a preliminary thread on the intermediate molded article 202 (204), the preliminary thread may be formed in the second intermediate molding region 202B (204B).

Although only some embodiments of the invention have been described in detail above, those skilled in the art would readily appreciate that many modifications are possible in the embodiments without materially departing from the novel teachings and advantages of the invention. Accordingly, all such modifications are intended to be included within scope of the invention. Any term cited with a different term having a broader meaning or the same meaning at least once in the specification and the drawings can be replaced by the different term in any place in the specification and the drawings.

The invention is not limited to a method for molding a wide-mouth heat-resistant container, but may also be applied to a method for molding a container used for other applications.

REFERENCE SIGNS LIST

200: preform, 201: neck, 202: intermediate molded article, 202A: first intermediate molding region (first molding region), 202B: second intermediate molding region (second molding region), 202B 1: preliminary thread, 202C: third intermediate molding region (third molding region), 204: shrunken intermediate molded article, 204A: first intermediate molding region (first molding region), 204B: second intermediate molding region (second molding region), 204B1: narrow part, 204C: third intermediate molding region (third molding region), 206: final molded article, 206A: first final molding region (first molding region), 206B: second final molding region (second molding region), 206B 1: narrow part, 206B2: thread, 206C: third final molding region (third molding region), 206C1: thread, 208:

end product, 210, 211: parting line, 220, 221: trace line of insulating layer, 300A, 300B, 300C: primary blow mold, 301: first primary insulating layer (primary insulating layer), 302: second primary insulating layer, 310: holding plate, 320: primary blow split mold, 320A to 320C: first to third primary split molds, 330: primary temperature control section, 330A to 330C: first to third primary temperature control sections, 340: bottom mold, 400A, 400B, 400C: secondary blow mold, 401: first secondary insulating layer (secondary insulating layer), 402: second secondary insulating layer, 410: holding plate, 420: secondary blow split mold, 420A to 420C: first to third secondary split molds, 430: secondary temperature control section, 430A to 430C: first to third secondary temperature control sections, 440: bottom mold.

What is claimed is:

1. A method including a blow molding method for two-step blow molding into a final molded article having a temporary part that is cut off for obtaining an end product, the method comprising the steps of:
    a primary blow molding step that blow-molds a preform into an intermediate molded article in a primary blow mold, the primary blow mold including a primary temperature control section, and the intermediate molded article having the temporary part;
    a shrinkage step that discharges blow air from the intermediate molded article to shrink the intermediate molded article in the primary blow mold;
    a secondary blow molding step that blow-molds the intermediate molded article into the final molded article in a secondary blow mold, the secondary blow mold including a secondary temperature control section, and
    cutting off the temporary part from the final molded article,
        wherein the primary blow mold includes a first primary temperature control section, a second primary temperature control section and a third primary temperature control section that are defined by dividing the primary temperature control section in a vertical stretch direction,
        wherein the primary blow molding step includes:
    cooling a first intermediate molding region of the intermediate molded article that follows a neck thereof and corresponds to the temporary part of the final molded article using the first primary temperature control section,
    controlling a temperature of a second intermediate molding region that corresponds to a bottomed body of the end product to a temperature higher than a temperature set for the first primary temperature control section using the second primary temperature control section, and
    controlling a temperature of a third intermediate molding region that corresponds to a neck of the end product and is situated between the first intermediate molding region and the second intermediate molding region to a temperature between a temperature set to the first primary temperature control section and a temperature set to the second primary temperature control section using the third primary temperature control section, and
    wherein the shrinkage step shrinks a second intermediate molding region of the intermediate molded article, the temperature of the second intermediate molding region having been controlled by the second primary temperature control section.

2. The blow molding method as defined in claim 1,
    wherein the primary blow mold includes a first primary insulating layer that is provided at a position corresponding to a first primary temperature control boundary between the first intermediate molding region and the third intermediate molding region, and a second primary insulating layer that is provided at a position corresponding to a second primary temperature control boundary between the second intermediate molding region and the third intermediate molding region, and the temperature of the first intermediate molding region, the temperature of the second intermediate molding region, and the temperature of the third intermediate molding region are controlled in the primary blow molding step while insulating the first intermediate molding region, the second intermediate molding region, and the third intermediate molding region at the first primary temperature control boundary and the second primary temperature control boundary.

3. The blow molding method as defined in claim 1,
    wherein the secondary blow mold includes a first secondary temperature control section and a second secondary temperature control section that are defined by dividing the secondary temperature control section in the vertical stretch direction, and
    wherein the secondary blow molding step cools a first final molding region of the final molded article that follows the neck, using the first secondary temperature control section, and controls the temperature of a second final molding region of the final molded article that has been blow-molded, using the second secondary temperature control section.

4. The blow molding method as defined in claim 3,
    wherein the secondary blow mold further includes a third secondary temperature control section that controls the temperature of a third final molding region that is situated between the first final molding region and the second final molding region, and
    wherein the third secondary temperature control section controls the temperature of the third final molding region in the secondary blow molding step to a temperature higher than a temperature set to the first secondary temperature control section.

5. The blow molding method as defined in claim 4,
    wherein the secondary blow mold includes a first secondary insulating layer that is provided at a position corresponding to a first secondary temperature control boundary between the first final molding region and the third final molding region, and a second secondary insulating layer that is provided at a position corresponding to a second secondary temperature control boundary between the second final molding region and the third final molding region, and the temperature of the first final molding region, the temperature of the second final molding region, and the temperature of the third final molding region are controlled in the secondary blow molding step while insulating the first final molding region, the second final molding region, and the third final molding region at the first secondary temperature control boundary and the second secondary temperature control boundary.

6. The blow molding method as defined in claim 4,
    wherein a thread is formed in the third final molding region of the final molded article only by the secondary blow molding step.

7. The blow molding method as defined in claim 4,
    wherein the primary blow molding step forms an irregular pattern that corresponds to a thread in the second intermediate molding region, and wherein the secondary blow molding step forms the thread in the third final molding region of the final molded article.

8. The blow molding method as defined in claim 7, wherein the primary blow molding step forms an orientation section in the first intermediate molding region, the orientation section indicating a direction of the intermediate molded article around a vertical axis, and wherein the secondary blow molding step positions the intermediate molded article in a rotation direction around the vertical axis using the orientation section.

9. The blow molding method of claim 1, wherein the primary blow mold comprises:
a first primary temperature control section, a second primary temperature control section and a third primary temperature control section that are divided in a vertical stretch direction,
wherein the first primary temperature control section cools a first intermediate molding region of an intermediate molded article that follows a neck thereof and corresponds to the temporary part of a final molded article,
wherein the second primary temperature control section controls the temperature of a second intermediate molding region that follows the first intermediate molding region that corresponds to a bottomed body of the end product to a temperature higher than a temperature set to the first temperature control section, and
a third primary temperature control section that controls the temperature of a third intermediate molding region that is situated between the first intermediate molding region and the second intermediate molding region,
wherein there is a step of using the third temperature control section to control the temperature of the third intermediate molding region to a temperature that is between a temperature set to the first primary temperature control section and a temperature set to the second primary temperature control section.

10. The blow molding method of claim 9, further comprising:
a step of providing a first insulating layer at a position corresponding to a first boundary between the first molding region and the third molding region; and
a step of providing a second insulating layer at a position corresponding to a second boundary between the second molding region and the third molding region.

11. The blow molding method as defined in claim 1, wherein in the step of cooling a first intermediate molding region of the intermediate molded article, the temporary part is hardened relative to the third intermediate molding region that corresponds to a body portion of the intermediate molded article.

12. The blow molding method as defined in claim 11, wherein there is a step of transporting the intermediate molded article by the neck portion of the temporary part to the secondary blow mold.

13. The blow molding method as defined in claim 1, wherein during the shrinkage step, the second intermediate molding region corresponding to the bottomed body of the end product is shrunk in the axial direction an amount greater than an amount of shrinkage in an axial direction of the first and third intermediate molding regions corresponding to the temporary part and the neck portion of the final product.

* * * * *